Oct. 29, 1935.                  A. B. BUTTERWORTH                  2,018,757
                        APPARATUS FOR CLEANING TANKS
                              Filed Jan. 10, 1931
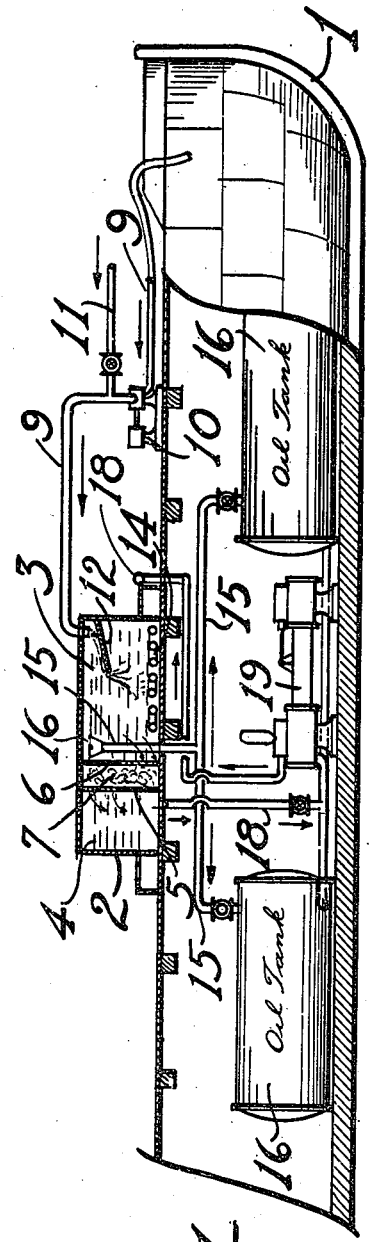
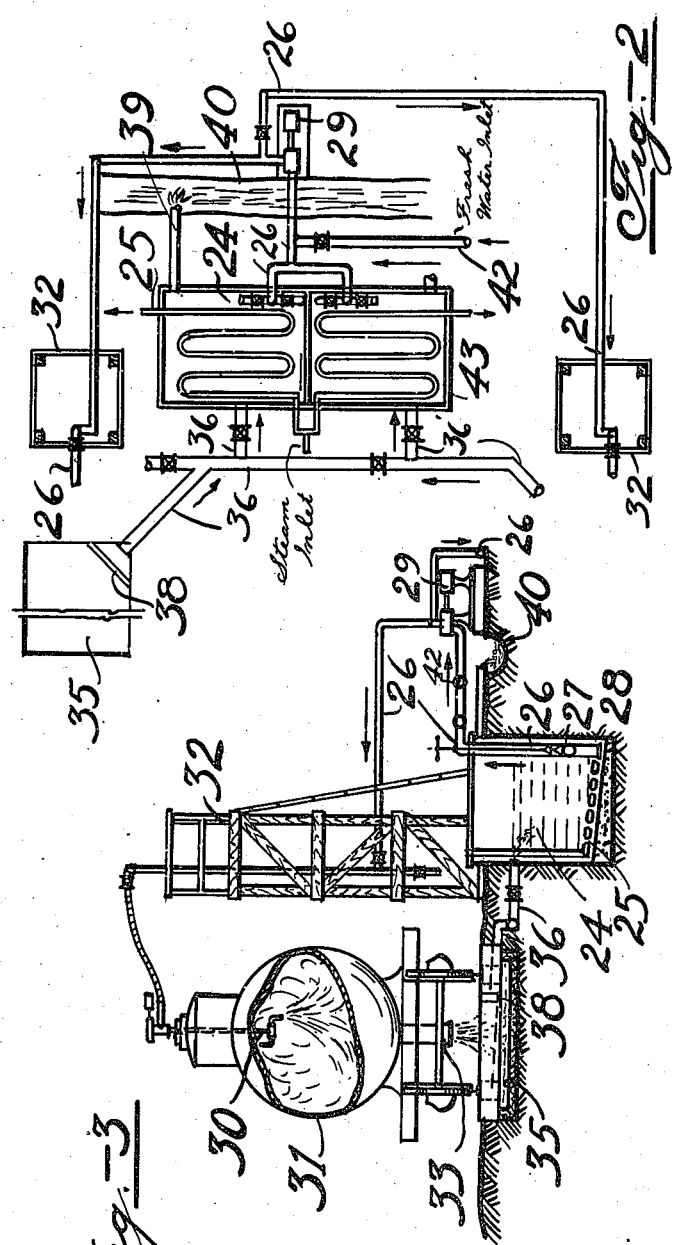
Inventor
Arthur B. Butterworth
W. E. Currie  Attorney Patented Oct. 29, 1935

2,018,757

UNITED STATES PATENT OFFICE 2,018,757

APPARATUS FOR CLEANING TANKS

Arthur B. Butterworth, Brooklyn, N. Y., assignor to Butterworth System, Inc., a corporation of Delaware Application January 10, 1931, Serial No. 507,778

1 Claim. (Cl. 210—43)

This invention relates to the cleaning of tanks of tank ships, tank cars and the like, which have become encrusted with oil scale or other material.

The invention will be fully understood from the following description taken in connection with the accompanying drawing, in which latter—

Fig. 1 is a side elevation of one form of cleaning device;

Fig. 2 is a top plan view of a modified form of cleaning device, and

Fig. 3 is an end elevation of the structure of Fig. 2.

Referring particularly to Fig. 1 of the drawing there is shown a cleaning ship 1, which is adapted to be brought alongside of a vessel to be cleaned and which contains the cleaning apparatus. The cleaning apparatus comprises a container 2 for cleansing liquid such as water, salt water, caustic solution or the like. Container 2 is divided into a receiving chamber 3 and a discharging chamber 4 by means of a filtering device which extends transversely across the container. The filtering device comprises spaced plates 5 and 6 with an intermediate layer of porous material 7 such as burlap, waste or the like. Plate 6 is provided with perforations in its lower portion and plate 5 is provided with perforations in its upper portion.

Cleaning liquid from the bottom of the particular compartment (not shown) of the ship being cleaned and containing impurities is introduced into chamber 3 through a line 9 and pump 10. Fresh water can be introduced into line 9 through a branch line 11, when desired. Baffle means 12 are disposed in the chamber 3 adjacent the inlet. The cleaning liquid is heated to temperatures for effective cleaning such as, for example, 150° to 180° F. or higher by means of a suitable heating medium passed through coils 14. If desired, steam can be injected into the liquid.

The mixture of cleaning liquid and oil or other impurity introduced into chamber 3 is permitted to stratify with the oil forming a layer upon the surface of the water. A discharge line 15 is provided having a funnel shaped inlet 16 opening into the upper portion of chamber 3 by means of which the surface layer of oil is decanted from the water and is discharged into tanks 16. The thus purified cleaning liquid is then passed through the filtering medium into discharge chamber 4 from which it is conducted through a discharge line 18 and pump 19. Discharge line 18 can communicate with a suitable cleaning machine (not shown) through which the cleansing liquid is injected into the compartment to be cleaned. The cleansing liquid together with the oil and the like removed from the walls of the compartment is reinjected through line 9 into inlet chamber 3 where it is reheated and recycled as above described.

Referring particularly to Figs. 2 and 3, a modified form of the device is shown for cleaning tank cars, trucks, and the like. The device comprises a settling and heating chamber 24 into which the cleaning liquid such as water, salt water or the like, is introduced. The liquid is heated to efficient cleaning temperatures such as 150° to 180° F. or higher by means of a suitable heating medium passed through coils 25. If desired steam can be injected directly into the liquid. The cleaning water is withdrawn from the tank through a line 26 which communicates with the chamber through openings 27 and 28 disposed at varying levels in the chamber. The bottom wall of the chamber is inclined toward the corner of the chamber into which line 26 opens. Line 26 communicates through a pump 29 with a suitable cleaning machine 30 through which the cleaning water is injected into a tank car 31 or other article to be cleaned. Line 26 is supported by a suitable frame work 32. The hot water strikes the inner sides of the tank car and washes the oil and other formed material from the walls thereof and is discharged through outlet 33 into a basin 35. A line 36 connects basin 35 with chamber 24 to introduce the oil contaminated wash water into the chamber. A weir 38 is provided in basin 35 in position to prevent the passage of scale or other solid material into line 36. The oil and water stratify in chamber 24 and the oil is permitted to drain from the chamber through a line 39 to a ditch 40. The wash water is reheated in chamber 24 and is recycled as has been described. Fresh water can be introduced into the system as required through a line 42. A chamber 43 identical with chamber 24 can be provided if it is desired to use a cutting oil such as kerosene for a cleansing liquid.

By the procedure described a limited quantity of cleaning liquid is used for washing oil encrusted tanks. The cleaning liquid is initially heated to a temperature suitable for efficient cleaning and this temperature can be maintained upon recycling the liquid by the application of only sufficient heat to raise the temperature of the partially cooled used liquid to its initial temperature.

Various changes may be made within the scope of the appended claim in which it is desired to claim all novelty inherent in the invention as broadly as the prior art permits.

I claim:

A device for revivifying and renewing tank wash liquid, comprising a container, a filter mass, a pair of vertical baffle plates, confining the filter mass and forming a receiving and settling chamber for the used liquid at one end of the container and a substantially smaller discharge chamber at the other end of the container, the baffle plate adjoining the settling chamber having perforations in its lower portion and the baffle plate adjoining the discharge chamber having perforations in its upper portion, a common means for introducing the used wash liquid and fresh feed into the settling chamber, means to heat the contents thereof and means for withdrawing a part of the upper portion of such contents to collecting tanks, an outlet in the discharge chamber to withdraw the revivified and renewed wash liquid and means for delivering said liquid to the point of use.

ARTHUR B. BUTTERWORTH.